United States Patent [19]

Tamura et al.

[11] Patent Number: 4,866,618

[45] Date of Patent: Sep. 12, 1989

[54] ENGINE CONTROL SYSTEM FOR AUTOMOTIVE VEHICLE

[75] Inventors: Minoru Tamura; Terukiyo Murakami, both of Yokohama; Hideaki Inoue, Yokosuka; Toru Iwata, Yokohama, all of Japan

[73] Assignee: Nissan Motor Co., Ltd., Yokohama, Japan

[21] Appl. No.: 69,143

[22] Filed: Jul. 2, 1987

[30] Foreign Application Priority Data

Jul. 3, 1986 [JP] Japan .................................. 61-157390
Jul. 10, 1986 [JP] Japan .................................. 61-162248
Jul. 10, 1986 [JP] Japan .................................. 61-162250

[51] Int. Cl.$^4$ ............................................. B60K 13/02
[52] U.S. Cl. ......................... 364/431.03; 364/426.02; 180/197
[58] Field of Search ................ 364/424.01, 431.03, 364/431.07, 431.05, 426.02; 180/197; 123/480, 492; 303/97, 99, 106

[56] References Cited

U.S. PATENT DOCUMENTS

| | | | |
|---|---|---|---|
| 4,681,374 | 7/1987 | Nakamura et al. | 180/197 |
| 4,685,547 | 8/1987 | Ohashi et al. | 180/197 |
| 4,722,411 | 2/1988 | Ohashi et al. | 180/197 |
| 4,736,814 | 4/1988 | Yogo et al. | 180/197 |
| 4,768,608 | 9/1988 | Hrovat | 364/426.02 |

FOREIGN PATENT DOCUMENTS

186122 7/1986 European Pat. Off. .
60-43133 3/1985 Japan .

Primary Examiner—Parshotam S. Lall
Assistant Examiner—V. N. Trans
Attorney, Agent, or Firm—Foley & Lardner, Schwartz, Jeffery, Schwaab, Mack, Blumenthal & Evans

[57] ABSTRACT

A plurality of control maps which are used to control the position of an engine throttle valve or similar device which effects the power output of the engine, are stored in memory. The wheel slip of the vehicle is monitored and if found to be in excess of an allowable limit or limits the control map currently in use is changed or downgraded to one which exhibits less rapid engine power generation characteristics. On the other hand, if the rate at which a control element such as an accelerator pedal is moved in direction which demands increased engine output is greater than zero; the amount of wheel slip is below the allowable limit or limits; and the control signal being produced by the instant control map is at its maximum permissible level for the instant position of the control element, then the currently used map is upgraded to one which permits increased and more rapid engine power development. Alternatively, it is possible to define upper and lower accelerator depression limits and use these in a manner that when the depression is below the lower limit map upgrading is inhibited while when above the limit upgrading is induced if the slip ratio remains at an acceptable level for a selected period of time.

14 Claims, 16 Drawing Sheets

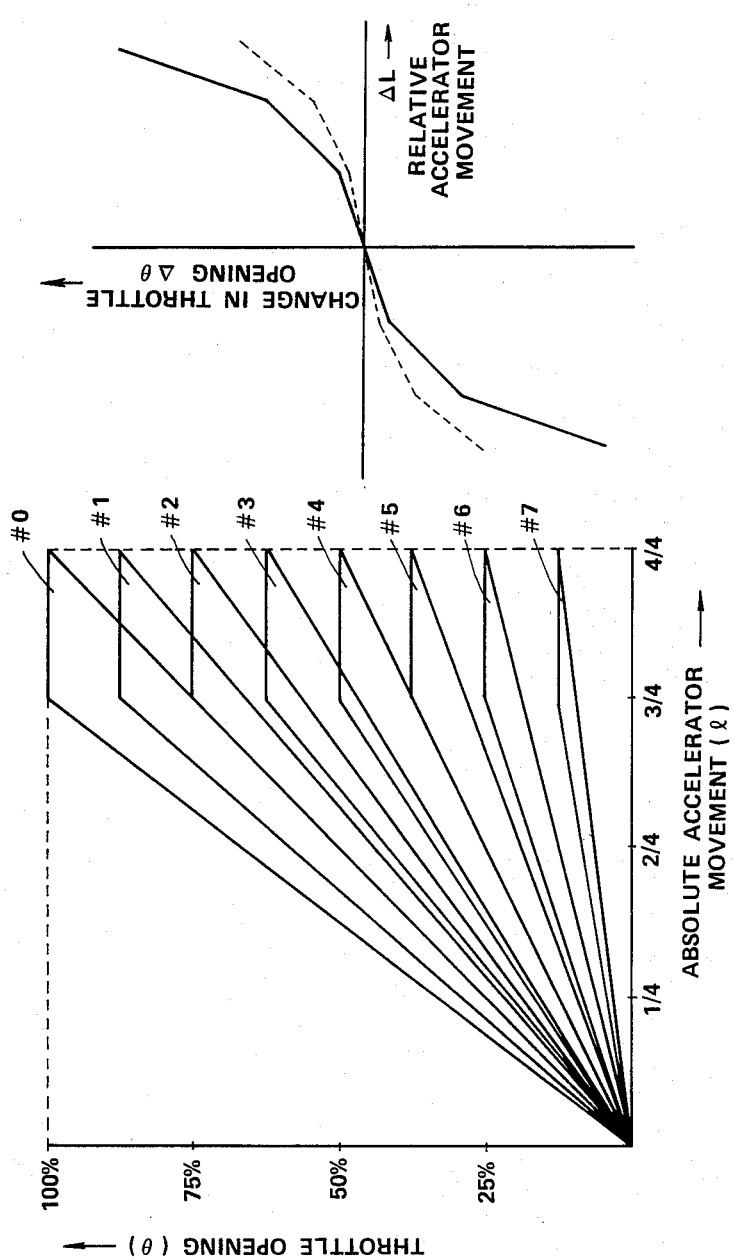

ENGINE CONTROL SYSTEM FOR AUTOMOTIVE VEHICLE

BACKGROUND OF THE INVENTION

1. Field of the Invention

The present invention relates to a vehicle control system and more specifically to a control system which enables the engine to be electronically controlled in response to an accelerator position.

2. Description of the Prior Art

Japanese Patent Pre-publication No. 60-43133 discloses a system wherein the engine is electronically controlled in response to the vehicle accelerator. In this system the driven wheel speed and the non-driven wheel speeds are sensed and used to detect the vehicle tire slip ratio. The derived ratio is compared with a predetermined value and, in the case the instant slip value exceeds the predetermined one, the amount of fuel supplied to the engine is controlled in accordance with the accelerator position.

With this arrangement, in the event that the condition of the road on which the vehicle is running changes, for example from wet to snowy conditions, and the detected slip ratio exceeds the predetermined value, the amount of fuel supplied to the engine is reduced to lower the engine output power and thus control the situation. However, if the road conditions then change back to ones wherein good traction occurs and the slip ratio diminishes, the amount of fuel supplied to the engine is increased in a manner to re-establish the engine output to the level provided before the poor road conditions were encountered irrespective of the accelerator manipulation. However, this control induces the drawback that, even though the accelerator depression remains constant, the amount of fuel supplied to the engine varies in a manner which causes the engine to surge and produce more torque than expected and induces a situation wherein the driver experiences a disconcerting loss of correlation between the accelerator pedal position and the operation of the engine.

In addition to the above, if wheel slip is encountered and the control system reduces the amount of fuel supplied to the engine and corrects the problem, the control system subsequently effects steps to increase the engine output. However, even though the system is controlled in accordance with the accelerator position parameter, even if the driver subsequently deeply depresses the accelerator to obtain vehicle acceleration, the system (during this correction period) fails to respond quickly and the engine output increases gently and below the rate that would be expected for the given depression. This again gives rise to the problem that the desired response to accelerator depression is not derived and the driver experiences a disconcerting loss of control over the engine.

With the above system, if the engine is operating with the accelerator pedal depressed by only a small amount, and the traction between the vehicle tires and road lowers (viz., due wet or icy conditions) the amount of fuel supplied to the engine is decreased. However, when traction subsequently improves the amount of fuel supplied to the engine is increased in a manner which produces a slightly excessive amount of torque and induces wheel slip even though the depression of the accelerator remains unchanged. This tends to increase the instant slip ratio above the predetermined level and induces a reduction in the amount of fuel supplied to the engine. This phenomenon tends to cyclically repeat itself inducing the engine torque to hunt and cause the vehicle to lurch and/or shudder unpleasantly.

SUMMARY OF THE INVENTION

It is an object of the present invention to provide a control system which is responsive the position and operation of the accelerator pedal in a manner which in combination with the wheel slip changes the control schedule selectively and provides both good slip control and response to driver demand.

In brief, a first embodiment of the present invention takes the form of an arrangement wherein the wheel speeds of the vehicle are sensed and used to determine if the tires are slipping and what the ratio of the slip is. In response to this calculation and in response to the amount of absolute accelerator depression, the appropriate one of a plurality of domain control maps is selected. Subsequently, the appropriate throttle position change is calculated using the relative accelerator movement and compared with the maximum permissible value for the given absolute accelerator depression to determine if a new map should be selected or not. A throttle valve target value is calculated on the basis of a value derived using the present position and the calculated throttle position change and compared with the actual throttle position value to derive a control signal which energizes the throttle valve actuator 124.

A second embodiment is basically similar to the first one and differs essentially in that upper and lower absolute accelerator depression limits are established so that when the accelerator depression is below the lower limit control map upgrading is inhibited while if above the upper limit upgrading is induced if the slip ratio remains below a predetermined level for a predetermined period.

In more specific terms a first aspect of the present invention is deemed to take the form of a method of controlling an internal combustion engine for a wheeled automotive vehicle which features the steps of: sensing a parameter which varies with a demand for engine power; storing a first set of control maps in a memory; arranging each of the maps to produce an engine control value, the magnitudes of which increase in response to the magnitude and rate of change of the parameter; designing the maps to exhibit control characteristics wherein the magnitude of the engine control signal for a given magnitude of the parameter, increases from map to map; sensing wheel slip; downgrading the maps by changing the currently used one to one which reduces the response characteristics when the wheel slip exceeding a first predetermined value; upgrading the maps by changing the currently used one to one which increases the response characteristics in response to: (a) the amount of wheel slip is below the first predetermined value; and (b) the control signal being produced by he instant control map is at its maximum permissible level for the instant magnitude of the parameter.

A second aspect of the invention is deemed to come in the form of a control system for an internal combustion engine for a wheeled automotive vehicle which features means for sensing a parameter which varies with a demand for engine power; a memory in which a first set of control maps are stored, the maps being arranged to produce an engine control value the magnitudes of which increase in response to the magnitude and rate of change of the parameter, the maps being designed to exhibit control characteristics wherein the magnitude of the engine control signal for a given magnitude of the parameter, increases from map to map; means for sensing wheel slip; and control means for: (a) downgrading the maps by changing the currently used one to one which reduces the response characteristics when the wheel slip exceeding a first predetermined value; (b) upgrading the maps by changing the currently used one to one which increases the response characteristics in response to: (i) the amount of wheel slip is below the first predetermined value; and (ii) the control signal being produced by the instant control map is at its maximum permissible level for the instant magnitude of the parameter.

In general terms with the control provided by the present invention it is possible that:

(a) When a vehicle traverses a road the surface condition of which is wet or snowy, the lowest grade of a plurality domain control maps stored in the memory of the system is selected. This map is compiled in a manner to provide dull response characteristics which ensure that under the instant set of adverse conditions relatively large amounts of power will not suddenly be dangerously applied to the drive wheels of the vehicle. When the road surface improves (changes from wet to dry for example) and the detected wheel slip ratio is lower than the predetermined level of the instant control map and actual throttle position is at the upper limit for the instant absolute amount of accelerator depression for the instant map, a new upgraded domain control map is selected. The characteristics of this map are such as to provide greater and more rapid opening of the throttle valve than the former map with respect to the accelerator depression and to increase the engine output in a manner which permits the vehicle to be accelerated.

(b) If the vehicle is traversing road which exhibits good tractive conditions and the accelerator is depressed beyond the predetermined limit for the instant control map and simultaneously the wheel slip is lower than the critical or predetermined value, depending on the ratio between the accelerator depression amount and the throttle opening, the domain control map is upgraded to one which rapidly increases engine output in response to accelerator depression and provides improved acceleration characteristics.

(c) When the throttle depression amount remains below the predetermined value for the instant map, even though the slip ratio is below the critical level, the instant domain control map is maintained. Upgrading is determined on the basis of the ratio established between the accelerator depression amount to actual throttle opening degree and until the maximum permissible throttle opening for the given absolute amount of accelerator depression for the instant control map is reached upgrading is inhibited. Accordingly, at low throttle settings the hunting/shudder problem mentioned above is obviated.

BRIEF DESCRIPTION OF THE DRAWINGS

FIG. 3 is a graph showing in terms of absolute throttle valve movement or depression and actual throttle valve opening, the control characteristics provided by 8 control maps #0-#7 which are stored in the memory of the system;

FIG. 4 shows in terms of throttle valve position change and relative accelerator movement or depression, a map which is used to determine the degree by which the throttle valve should be moved for a given amount of accelerator depression;

DETAILED DESCRIPTION OF THE PREFERRED EMBODIMENTS

Figure 1:
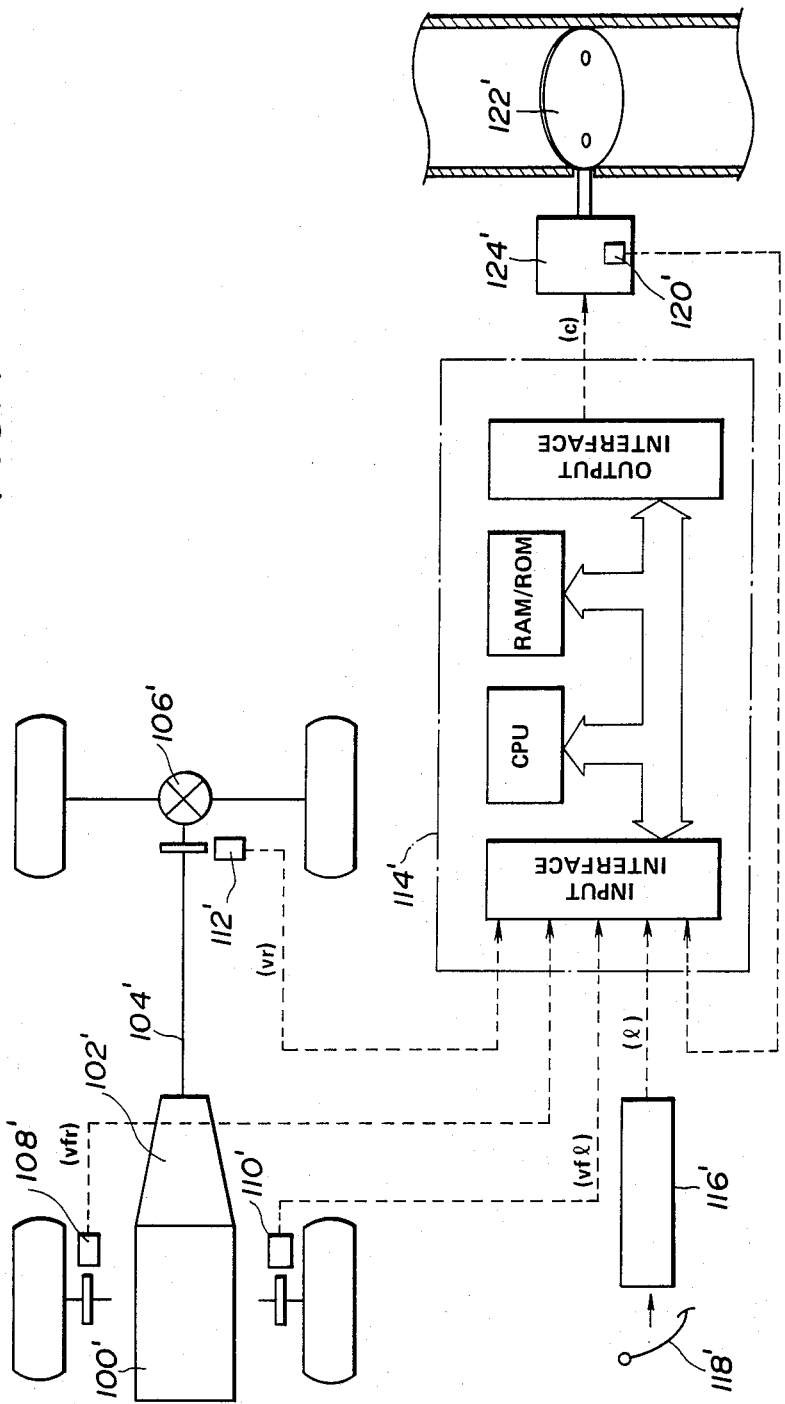
FIG. 1 shows in schematic plan a vehicle to which the embodiments of the present invention are applied.

FIG. 1 shows in schematic form a vehicle to which the embodiments of the present invention are applied. This arrangement includes an engine 100', a clutch and transmission unit 102', a drive shaft 104' interconnecting the transmission and a final gear or differential 106'. The rotational speed VFL, VFR of the undriven wheels of the vehicle are sensed by individual rotational speed sensors 108', 110' while the rotational speed VR of the driven wheels is detected by a single sensor 112' which detects the rotational speed of the drive shaft 104'. Although the instant arrangement depicts a F—R (front engine—rear wheel drive) type vehicle it will be understood by those skilled in the art of automotive engineering that the same sensor arrangement can be applied to F—F (front engine—front wheel drive) vehicles.

A control circuit 114' which in this instance includes a microprocessor is arranged to receive data inputs from the three rotational speed sensors 108', 110', 112', a potentiometer 116' operatively connected to an accelerator pedal 118' (hereinafter referred to as accelerator) and from a throttle valve position sensor 120' via an input interface.

The ROM of the microprocessor contains control programs, maps and other pertinent data which will be discussed hereinlater and which take the data provided and determined the most appropriate setting for the engine throttle valve 122'.

The control data derived in the CPU of the processor is converted to a control signal and applied via an output interface to an actuator 124' operatively to the throttle valve 122'.

The above mentioned rotational speed sensors may take the form of sensors which utilize light sources and shutter discs to produce a pulse signal indicative of rotational speed or alternatively a magnetic flux responsive arrangement. In the case the output of the sensor is analog the signal is F/V converted and subsequently A/D converted before being supplied to the CPU. The output of the potentiometer 116 is A/D converted.

In the instant embodiment the actuator 124' includes a stepping motor which is responsive to a pulse signal outputted by the control circuit.

Figure 2:
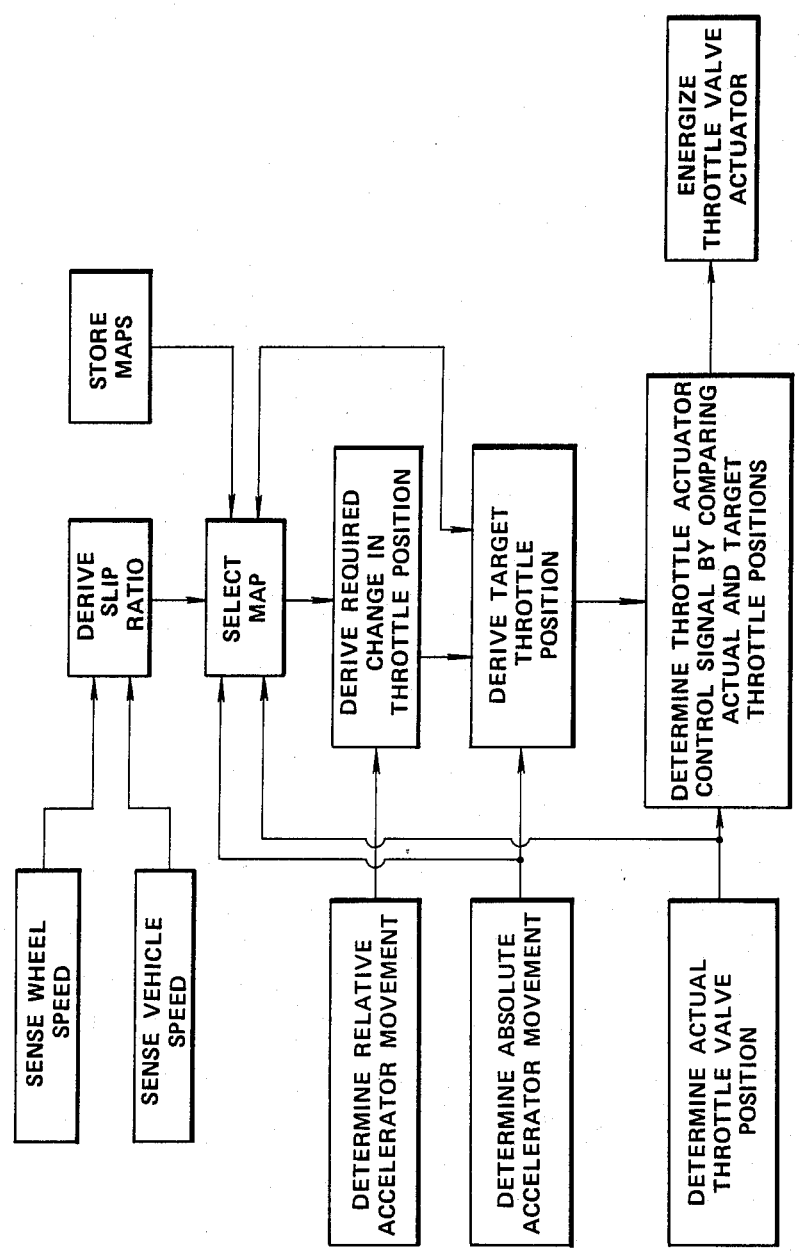
FIG. 2 shows in schematic form the functional arrangement of first embodiment of the present invention.

FIG. 2 shows schematically the arrangement which characterizes the first embodiment of the present invention.

As shown, the wheel speeds of the vehicle are sensed and this data is used to determine if the tires are slipping and what the ratio of the slip is. In response to this calculation and in response to the amount of absolute accelerator depression, the appropriate one of a plurality of domain control maps is selected. Subsequently, the appropriate throttle position change is calculated using the relative accelerator movement and compared with the maximum permissible value for the given absolute accelerator depression to determine if a new map should be selected or not. A throttle valve target value is calculated on the basis of a value derived using the present position and the calculated throttle position change and compared with the actual throttle valve position to derive a control signal which energizes the throttle valve actuator 124'.

The ROM of the control circuit includes in the instant embodiment, domain control maps #0 to #7.

valve These maps are plotted in terms of throttle position (THETA) and absolute accelerator movement or depression (L). Table 1 shows the correspondence between the values of "u" (coefficient of friction) and each of the maps.

TABLE 1

| MAP | #0 | #1 | #2 | #3 | #4 | #5 | #6 | #7 |
|---|---|---|---|---|---|---|---|---|
| "u" | — | 0.9 | 0.8 | 0.5 | 0.4 | 0.3 | 0.2 | 0.1 |

As will be appreciated from FIG. 3 map #0 is one which will produce the most rapid response to accelerator depression. Viz., with this control the throttle valve is opened sufficiently rapidly as to assume a fully open position when the accelerator has been depressed only $\frac{3}{4}$ of its maximum amount of depression. The second map #1 is such that the opening of the throttle valve stops at a position of approximately 86% of its maximum after the accelerator has been depressed $\frac{3}{4}$ of this maximum possible movement and remains in said position irrespective of further pedal depression. Subsequent maps #2 to #7 progressively produce less responsive throttle opening as will be readily seen.

The ROM further includes data which is recorded in terms of throttle position change and relative accelerator movement. This data is depicted in FIG. 4. If preferred it is possible to record one map wherein the data is such as depicted by the solid line and use this data for all calculations or alternatively provide a second map wherein the data recorded is such as depicted by the broken line. In the event that both the tables are recorded it is possible to use the broken line characteristics only when map #0 for example is being used to control the system and the solid line data when maps other than the most responsive one are being employed. As will be noted the broken line provides a more gently throttle opening characteristics than obtained with the solid line.

Figure 5A:
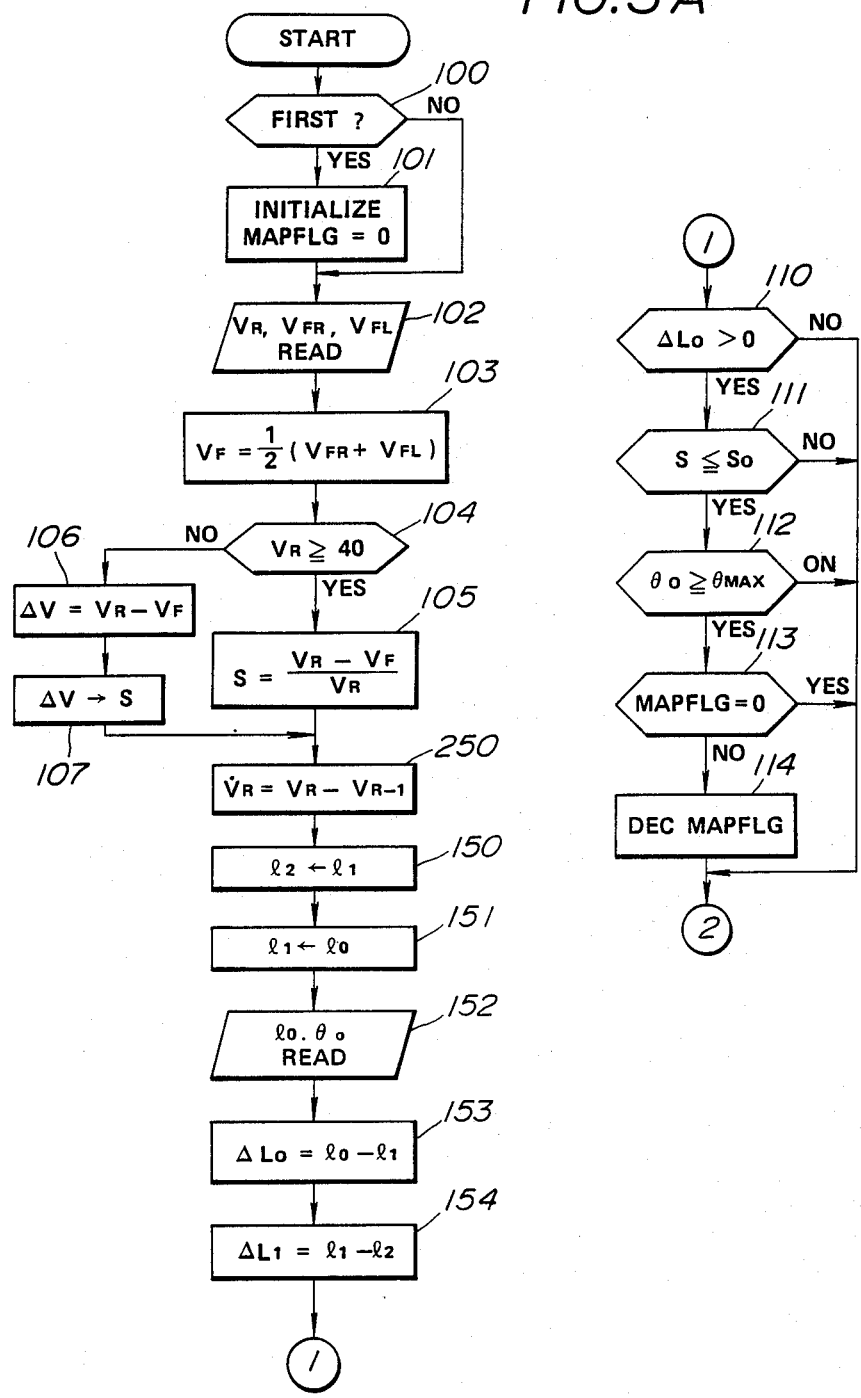
FIGS. 5A-C show a flow chart which depict the steps which characterize the operation of the first embodiment.
Figure 5B:
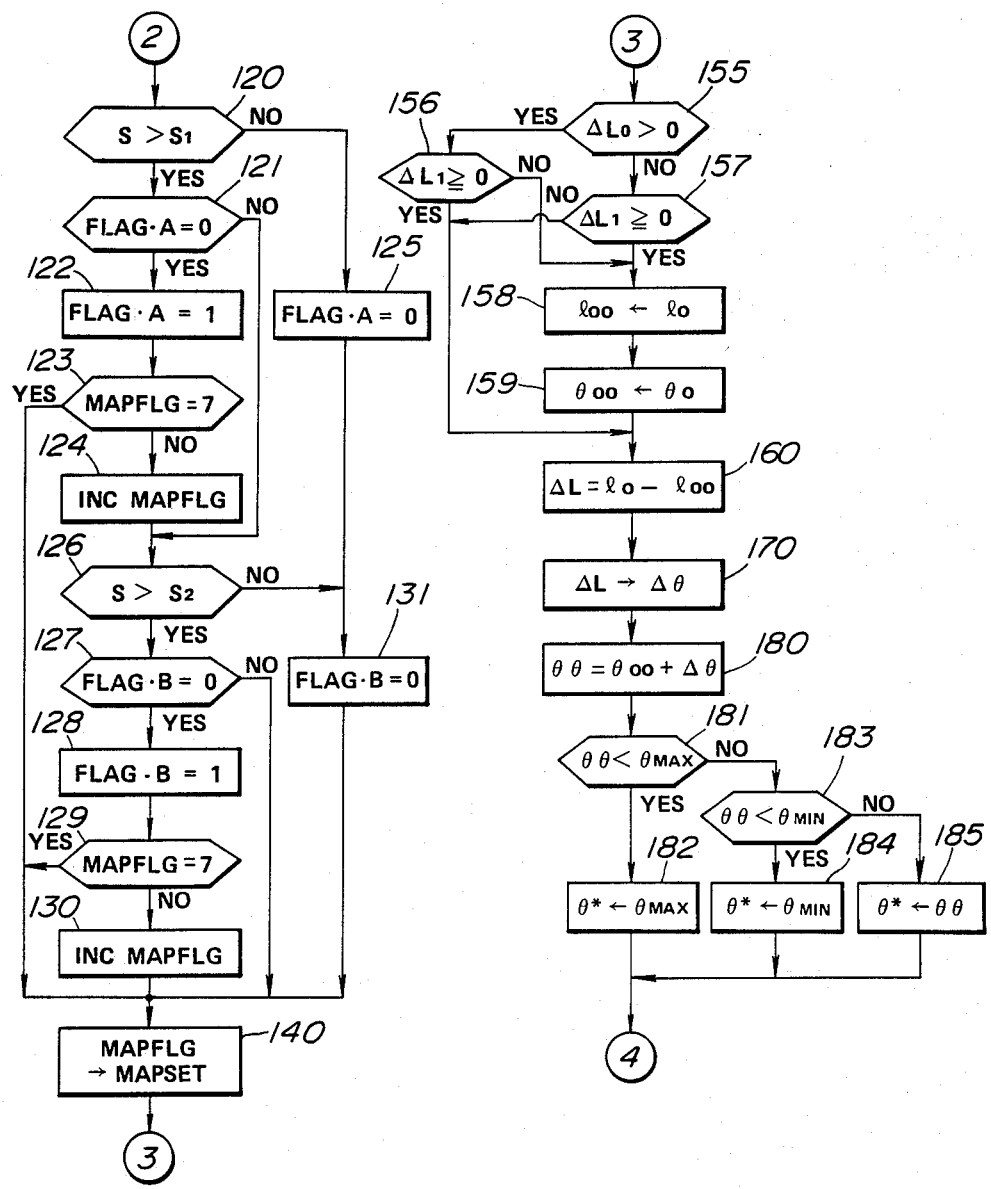
Figure 5C:
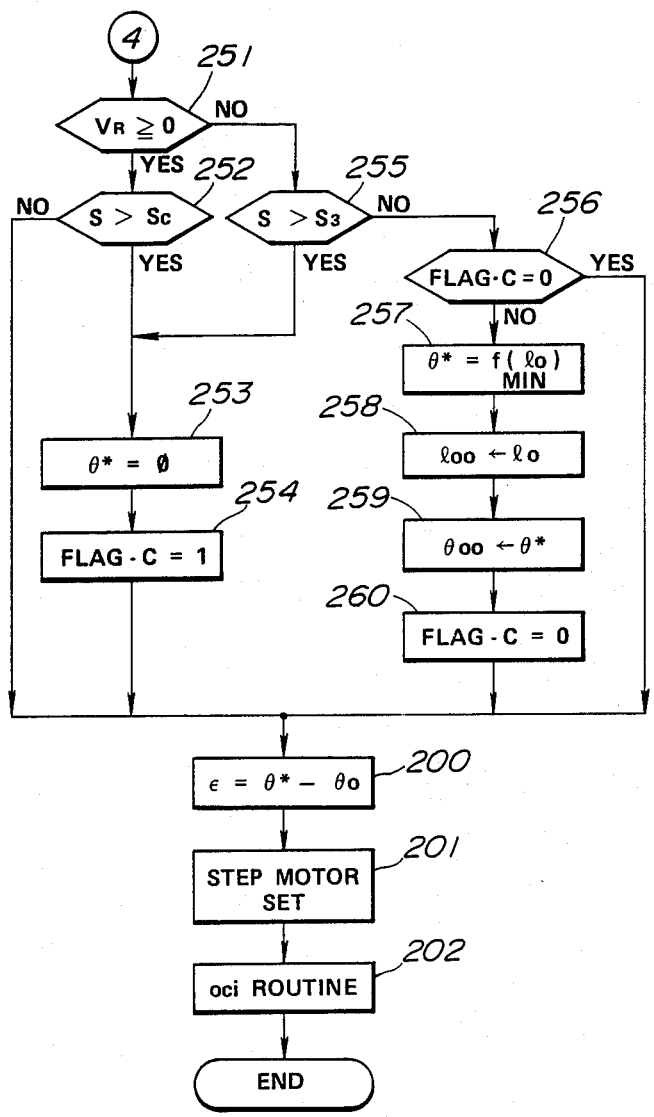
Figure 6:
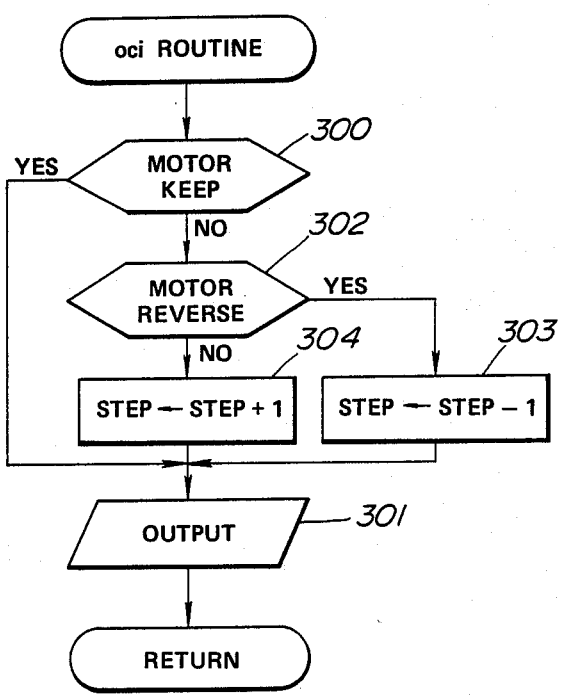
FIG. 6 shows a second flow chart which depicts the steps conducted in a sub-routine of the main routine shown in FIGS. 5A-C.

FIGS. 5 and 6 show flow charts depicting the steps which characterize the operation of the first embodiment. FIG. 5 shows the main control routine. This routine is arranged to be initiated by an interrupt and to run at 20 msec intervals for example. FIG. 6 shows a sub-routine which is run each time the main program flows through its final step 202.

The control circuit 114 is arranged to be responsive to the position of the engine ignition switch in a manner that when the switch is first closed the microprocessor is initialized and a flag MAPFLAG is arbitrarily set to zero, other flags used in the system are cleared (see step 101) and the program flows on. In order to check if the instant run of the control routine is the first since the system was initialized step 100 is provided. In this step it is determined if this is the first run or not. If the answer is negative then the program bypasses step 101.

Steps 102 to 107 involve the derivation of the instant slip ratio. At step 103 the inputs of the three speed sensors are sampled and the values temporarily stored in RAM. In step 103 the average front wheel speed is determined using the equation:

$$VF = \frac{1}{2}(VFR + VFL) \tag{1}$$

At step 104 the rear wheel speed Vr is compared with a predetermined value indicative of a vehicle speed of 40 Km/h. In the event that the speed is equal to or greater than this value then the program flows to step 105 wherein the slip ratio S is derived using equation:

$$S = (VR - VF)/VR \tag{2}$$

However, in the event that VR is less than the predetermined value then at steps 106 and 107 the difference between the front and rear wheel speeds is determined and this value is set in RAM as S.

Figure 7:
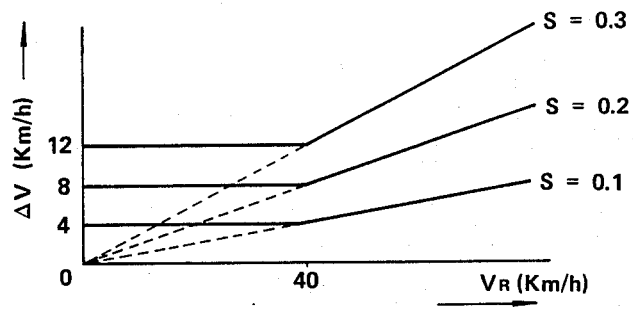
FIG. 7 is a graph showing in terms of the rotational speed difference between the front wheels of the vehicle and the rear wheels thereof and the rear wheel speed, the manner in which the slip ratio varies.

This situation is depicted in FIG. 7. Viz., for any value derived under the predetermined value (40 Km/h) the value of S remains constant while after said limit the value of "u" increases linearly.

At step 250 the value of .VR is calculated by determining the difference between the instant value of the rear wheel speed VR and the value VR−1 thereof recorded in the previous run of the main routine.

In accordance with the present invention in order to control the selection of the appropriate map it is important to determine a factor which shall be referred to as an "accelerator-work". In order to do this it is necessary to determine the instant status of the control. Steps 150 to 154 show the mode via which this derivation is executed. At step 150 the value L1 of the absolute accelerator depression recorded during the last run is set in RAM as the value L2 of the run before last. At step 151 the current value L0 currently held in RAM (actually determined in the last run) is set in RAM as L1. At step 152 the outputs of the potentiometer 116 and the throttle position sensor 120 are both sampled and the freshly determined instant value of L0 and the instant throttle valve setting THETA/0 are both updated and set in RAM. In step 153 the instant change in the absolute accelerator depression (DELTA/L0) is ascertained by determining the difference between the values of L0 and L1, while at step 154 the previous change in absolute accelerator depression (DELTA/L1) is obtained by determining the difference between the values of L1 and L2 as currently held in RAM.

Map selection (upgrade) is carried out in steps 110 to 114. In step 110 it is determined if DELTA/L0 is greater than zero. If the outcome is positive then steps 111 to 114 are bypassed. However, in the event that DELTA/L0 has a value greater than zero (viz., there has actually been a change in the pedal depression, then sat step 111 the instant value of S is compared with the value S0 (wherein S0=0.1 for example) If the value of S is found to be less than S0 then it can be assumed that there is little or no slip occurring and the program goes to step 112. However, if the reverse situation is ascertained then it can be assumed that the wheels are slipping to the degree that upgrading of the control map should not be implemented and the program flows to step 120.

At step 112 the instant value of THETA/0 is compared with a maximum permissible value THETA/max. If the value is at or greater than the upper limit then conditions necessary to permit upgrade are met and the program goes to step 113 wherein the instant value of flag MAPFLG is read out of RAM. If the flag is found to be other than "0" then the program flows on to step 114 wherein the value of MAPFLG is decremented by 1.

On the other hand, if the outcome of the enquiry conducted as step 112 indicates that the throttle valve has not yet been opened to the maximum value determined by the instant domain control map then it is deemed that it is not yet necessary to consider changing maps as the limits of the instant one have not as yet been reached. If it is found that the system is currently being operated on map #0 then as no further upgrade is possible and step 114 is by-passed.

At step 120 the instant value of S is compared with a value S1 (eg. S1=0.1). If the outcome indicates that the value is less than S1 then the program goes to step 125 wherein a flag FLAG.A is set to 0 (indicating that downgrading is not required). However, if the value of S is greater than S1 then the possibility that the map in current use is overly responsive for the instant set of conditions is established and at step 121 the instant value of FLAG.A is determined. If the value is 1 the program goes on to step 126 while in the event that it is 0, it is reset to 1 in step 122 (via a marker is established to indicate that downgrading is required).

In step 123 it is determined if the system is currently using map #7 (via the lowest grade). If the outcome is YES, further downgrading can be carried out and the program flows to step 140. On the other hand, if the MAPFLG value is less than 7 then the program goes to step 124 where the value is increased to the next highest value.

At step 126 the instant value of S is compared with a value S2 (eg. S2=0.3). If the value is found to be lower, then at step 131 a flag FLAG.B is set to 0. However, if the value is higher, then at step 127 the instant status of FLAG.B is determined. If the value is not 0 then the program goes to step 140. On the other hand, if the value of FLAG.B is 0 then it is set to 1 in step 128 to indicate a strong need to downgrade the currently used map.

At step 129 the instant status of MAPFLG is determined and if less than 7 it is incrementally increased by 1 in step 130. At step 140 the current status of MAPFLG is read from the RAM and the corresponding map fetched from memory (ROM) and set in RAM.

As will be appreciated the flow chart from step 120 to 140 is such as to double check the wheel slip against progressively increasing values and to set flags which will guide toward a downgrading. In contrast the steps 110 to 114 are such to control upgrading and require that: an acceptably small amount of slip is occurring; the throttle has been opened to maximum value permissible under the instant control map for the instant absolute accelerator depression; and that the accelerator is actually being moved in a direction which requires the throttle to opened further, are all simultaneously coexistent.

This ensures that if the accelerator pedal is being released or held in its current position then an upgrading which would tend to induce the control problems discussed in the opening paragraphs of the instant disclosure do not occur.

The amount of "work" done on the accelerator is determined in steps 155 to 159. In step 155 it is determined if the value of DELTA/L0 is greater than 0. If it is then the program goes to step 156 wherein it is determined if the value of DELTA/L1 is greater or equal to 0. If the change in absolute accelerator depression DELTA/L1 is 0 then the program flows to step 158 wherein the instant value of L is again sampled and the instant value L0 set in RAM as the standard value L00. Subsequently, in step 159 the output of the throttle valve sensor 120 is sampled and the instant value THETA/0 set in RAM as standard value THETA/00. It will be noted that the updating of the two above mentioned standard values is conducted only in the event that DELTA/L0 is not greater than 0 and DELTA/L1 is not greater or equal to 0. Viz., if insufficient "work" is being done on the accelerator pedal then the demand for throttle position change is assumed to be non-existent. In step 160 the length of the stroke of the accelerator which has taken place is determined in step 160. Of course during the run that the standard values are updated DELTA/L will have a value of 0 (viz., L0−L0=0). In step 170 the value of DELTA/L derived in the previous step is used to determine the corresponding value of DELTA/THETA using a map such as depicted in the FIG. 4. characteristics.

Steps 180-185 relate to the derivation of the throttle opening target value.

At step 180 a temporary throttle opening target value THETA/THETA is derived by adding the value of DELTA/THETA to the standard value THETA/00 determined in step 159. Following this the THETA/THETA value is firstly ranged against a value THETA/max which is obtained from the domain control table in current use. In step 183 it is again ranged but this time against a value THETA/min (also obtained from the instant domain control map—viz., from the lower boundary line of the instant map). In accordance with the two rangings the appropriate value of THETA/THETA is temporarily set in RAM (see steps 182, 184 and 185) as the instant throttle opening target value THETA/#.

Before implementing the just derived throttle valve target value in a manner to induce a change in throttle position, it is deemed appropriate to again examine the current slip conditions. To this end at step 251 the value of .VR is read out of RAM. If this value is greater or equal to 0 then the program goes to step 252 wherein the instant value of S is compared with a value Sc (wherein Sc 0.2 for example). If the value of S is found to be less than SC then the program goes directly to step 200 which will be discussed in more detail hereinafter. However if S is found to be greater than Sc then further consideration is necessary and the program goes to steps 253 and 254. In step 253 the throttle valve target value THETA/# is set to 0 and in step 254 a flag FLAG.C is set to 1.

However, if back at step 251 the value of .VR is found to be less than 0 (indicating that the vehicle is possibly being subject to braking such as engine braking or the like and the driven wheel speed has decreased below vehicle speed) then at step 255 S is compared with a value S3 (wherein S3 is selected to be 0.3 for example). In the event that S is greater than S3 then the program goes to step 253, while if lower then at step 256 the status of flag FLAG.C is determined. If FLAG.C=0 (indicating that actuator operation is deemed to be safe) then the program flows to step 200. However, in the event that FLAG.C =1 (indicating that caution should be exercised and that throttle valve variation should not be implemented for possible fear of increasing the slip conditions) then at step 257 the target value THETA/# is set equal to the value of THETA/min which corresponds to the instant absolute throttle valve depression value L0 for the instant domain control map.

In step 258 the instant value of L0 is set in RAM as the new standard throttle valve opening value L00 while in step 259 the throttle valve target value THETA/#is set in RAM as the standard throttle opening value THETA/00. FLAG.C is cleared in step 260.

At step 200 a value EPSILON is derived by subtracting the value of THETA/0 from the target value THETA/#. Viz., the angle through which the throttle valve should be rotated from its present position in order to arrive at the target value is derived.

Depending on the magnitudes of the just mentioned values, the value of EPSILON will be either positive or negative. In the case of a positive value the stepping motor which forms part of actuator 124 will be energized to rotate in a first direction while in the case of a negative result will be energized in the reverse direction. At step 201 a command is issued to prepare the stepping motor and in step 202 an "oci" Routine is implemented.

FIG. 6 shows the steps which characterize the operation of the "oci" routine. In step 300 if the value of EPSILON is 0 then a command which holds the motor in its present state is issued. On the other hand, if the value is not 0 then at steps 300 and 302 the decision as to which way the motor should be operated is issued. In this step if the value of EPSILON is positive (by way of example) then at step 304 a command to increment the present position by one step is issued. However, if the value is negative, then at step 303 a command to decrease the instant position by one increment is issued. At step 301 the appropriate command is issued through the output interface of the control circuit to the stepping motor in actuator 124.

Figure 8:
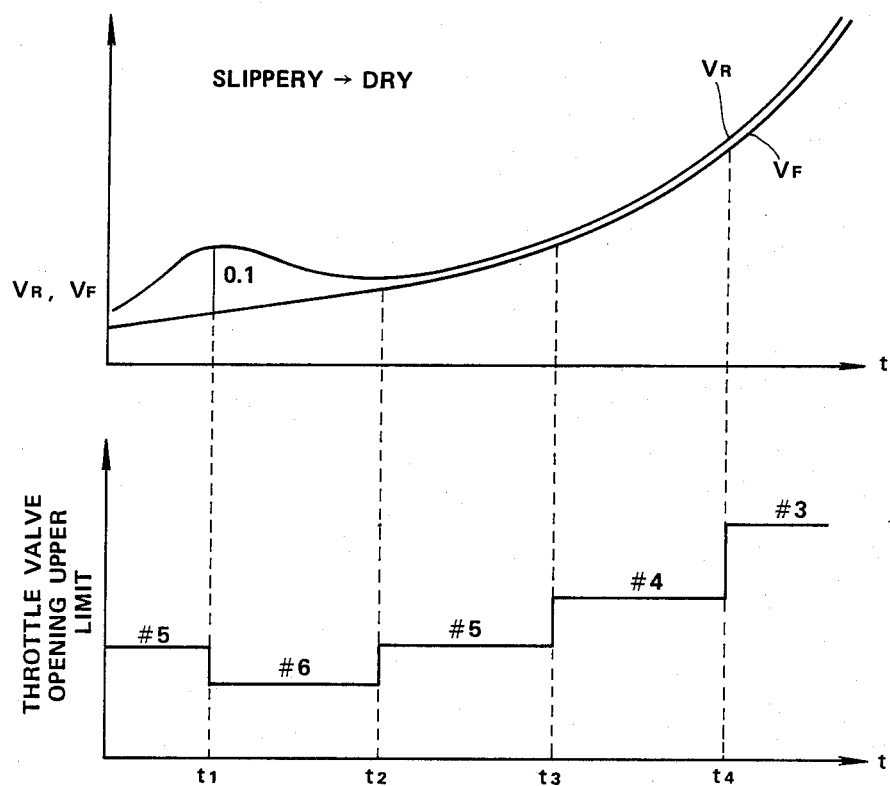
FIG. 8 is a timing chart which shows in terms of time, the changes in throttle valve position (lower section) which correspond to the variation in rotational speeds of the front and rear wheels which are induced by a predetermined set of operational conditions, provided with the first embodiment of the present invention.
Figure 9:
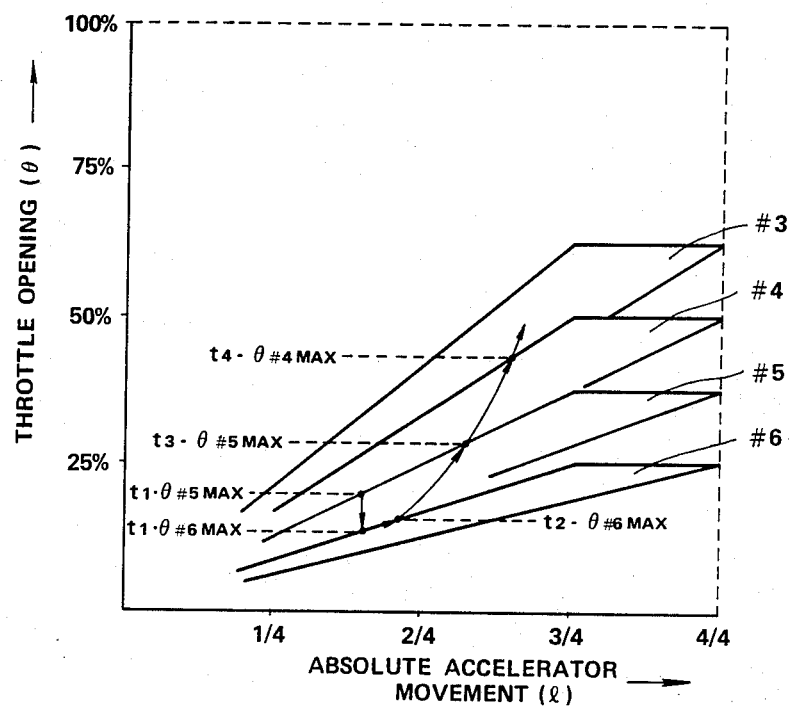
FIG. 9 is a chart showing in terms of throttle valve position and absolute accelerator movement or depression, the maximum throttle opening values at which the control map downgrading and subsequent upgrading are triggered in the control example shown in FIG. 8.

With the above disclosed technique it is possible to achieve the control depicted in FIGS. 8 and 9. For example, if the vehicle is traversing a road which is wet, snowy, frozen or has a loose gravel surface or the like, which induces wheel slippage and causes the rotational speeds of the front and rear wheels to vary such as shown in the upper half of the figure, the system responds by reducing (at time t1) the maximum throttle opening to that which corresponds to map #5. In step 160 the length of the stroke of the accelerator which has taken place is determined in step 160. Of course during the run that the standard values are updated DELTA/L will have a value of 0 (viz., L0−L0=0). In step 170 the value of DELTA/L derived in the previous step is used to determine the corresponding value of DELTA/THETA using a map such as depicted in FIG. 4 characteristics.

Steps 180–185 relate to the derivation of the throttle opening target value.

At step 180 a temporary throttle opening target value THETA/THETA is derived by adding the value of DELTA/THETA to the standard value THETA/00 determined in step 159. Following this the THETA/THETA value is firstly ranged against a value THETA/max which is obtained from the domain control table in current use. In step 183 it is again ranged but this time against a value THETA/min (also obtained from the instant domain control map—viz., from the lower boundary line of the instant map). In accordance with the two rangings the appropriate value of THETA/THETA is temporarily set in RAM (see steps 182, 184 and 185) as the instant throttle opening target value THETA/#.

Before implementing the just derived throttle valve target value in a manner to induce a change in throttle position, it is deemed appropriate to again examine the current slip conditions. To this end at step 251 the value of .VR is read out of RAM. If this value is greater or equal to 0 then the program goes to step 252 wherein the instant value of S is compared with a value Sc (wherein Sc 0.2 for example). If the value of S is found to be less than SC then the program goes directly to step 200 which will be discussed in more detail hereinafter. However if S is found to be greater than Sc then further consideration is necessary and the program goes to steps 253 and 254. In step 253 the throttle valve target value THETA/# is set to 0 and in step 254 a flag FLAG.C is set to 1.

However, if back at step 251 the value of .VR is found to be less than 0 (indicating that the vehicle is possibly being subject to braking such as engine braking or the like and the driven wheel speed has decreased below vehicle speed) then at step 255 S is compared with a value S3 (wherein S3 is selected to be 0.3 for example). In the event that S is greater than S3 then the program goes to step 253, while if lower then at step 256 the status of flag FLAG.C is determined. If FLAG.C =0 (indicating that actuator operation is deemed to be safe) then the program flows to step 200. However, in the event that FLAG.C=1 (indicating that caution should be exercised and that throttle valve variation should not be implemented for possible fear of increasing the slip conditions) then at step 257 the target value THETA/#is set equal to the value of THETA/min which corresponds to the instant absolute throttle valve depression value L0 for the instant domain control map.

In step 258 the instant value of L0 is set in RAM as the new standard throttle valve opening value L00 while in step 259 the throttle valve target value THETA/# is set in RAM as the standard throttle opening value THETA/00. FLAG.C is cleared in step 260.

At step 200 a value EPSILON is derived by subtracting the value of HETA/0 from the target value THETA/#. Viz., the angle through which the throttle valve should be rotated from its present position in order to arrive at the target value is derived.

Depending on the magnitudes of the just mentioned values the value of EPSILON will be either positive or negative. In the case of a positive value the stepping motor which forms part of actuator 124 will be energized to rotate in a first direction while in the case of a negative result will be energized in the reverse direction. At step 201 a command is issued to prepare the stepping motor and in step 202 an "oci" Routine is implemented.

FIG. 6 shows the steps which characterize the operation of the "oci" routine. In step 300 if the value of EPSILON is 0 then a command which holds the motor in its present state is issued. On the other hand, if the value is not 0 then at steps 300 and 302 the decision as to which way the motor should be operated is issued. In this step if the value of EPSILON is positive (by way of example) then at step 304 a command to increment the present position by one step is issued. However, if the value is negative, then at step 303 a command to decrease the instant position by one increment is issued. At step 301 the appropriate command is issued through the output interface of the control circuit to the stepping motor in actuator 124.

With the above disclosed technique it is possible to achieve the control depicted in FIGS. 8 and 9. For example, if the vehicle is traversing a road which is wet, snowy, frozen or has a loose gravel surface or the like, which induces wheel slippage and causes the rotational speeds of the front and rear wheels to vary such as shown in the upper half of the figure, the system responds by reducing (at time t1) the maximum throttle opening to that which corresponds to map #5 to map #6. Subsequently at time t2 as the control has lowered the power produced by the engine and the slip has reduced, the system upgrades the domain control map from #6 to #5. Thereafter as the demand for speed is maintained the system upgrades the maps as shown which permits the vehicle speed to increase without further wheel slip in the illustrated manner.

More specifically, assume that at time t1 that the slip ratio is 0.1. In response to this steps 120 to 124 of the main routine reduce the value of control map from #5 to #6. The maximum throttle opening which is permitted with this control map is about 40% of the maximum possible opening value (note that this value can be taken from FIG. 3).

Following this, as the road surface improves (goes from slippery to dry for example) and the slip ratio diminishes below 0.1 the system responds and induces a map upgrade to map #5. Subsequently as the slip remains at an acceptably constant value (viz., the difference between the traces VR and VF remain essentially constant) the system continues to induce upgrading such as shown a time t3 and t4. Accordingly, the response of the control rapidly improves while ensuring that slip is kept under acceptable control.

Figure 10:
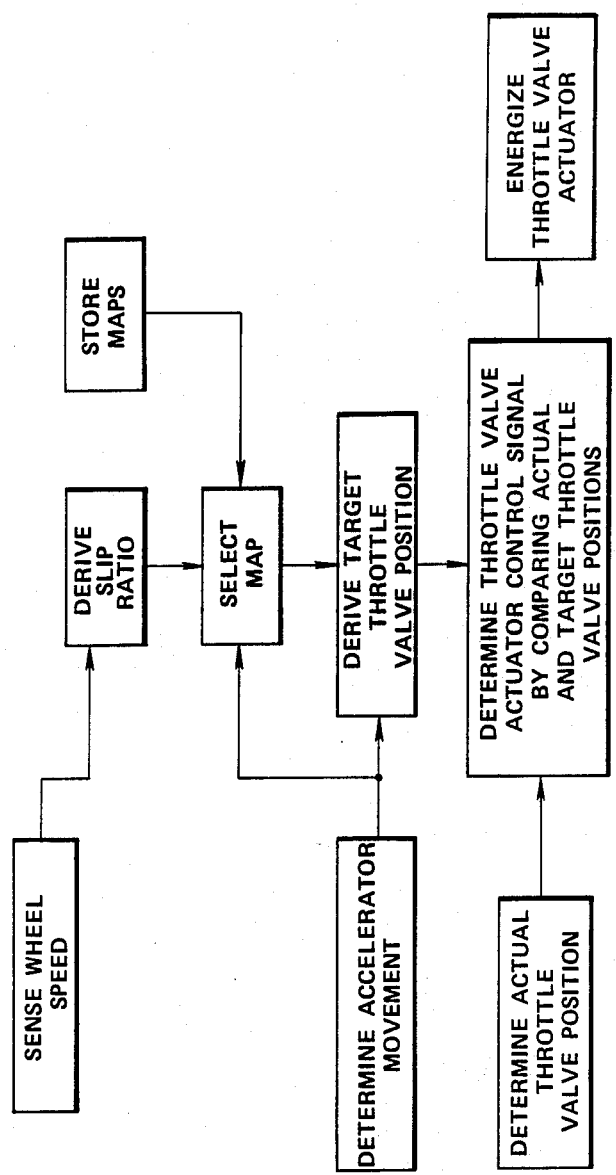
FIG. 10 is a schematic block diagram showing the operation of another embodiment of the present invention.
Figure 11A:
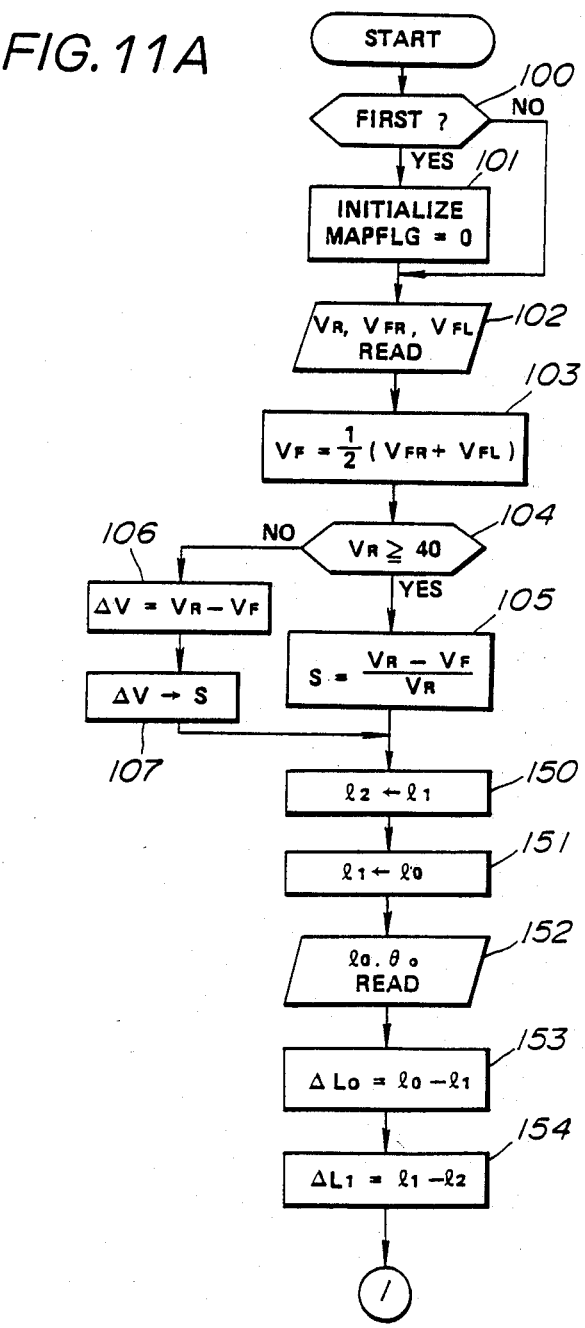
FIGS. 11A-D show a flow chart depicting the control steps which characterize the embodiment of the present invention shown in FIG. 10.
Figure 11B:
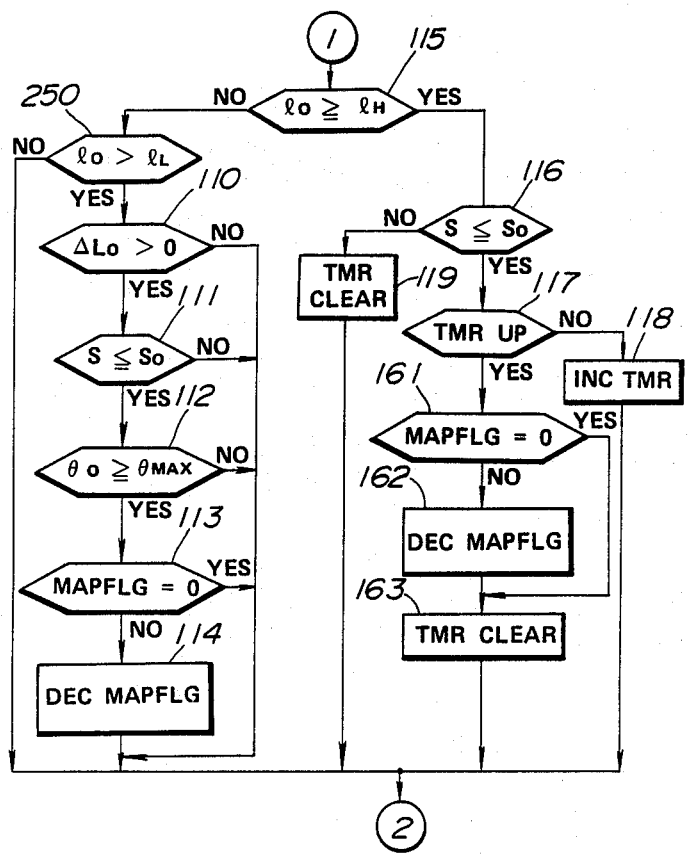
Figure 11C:
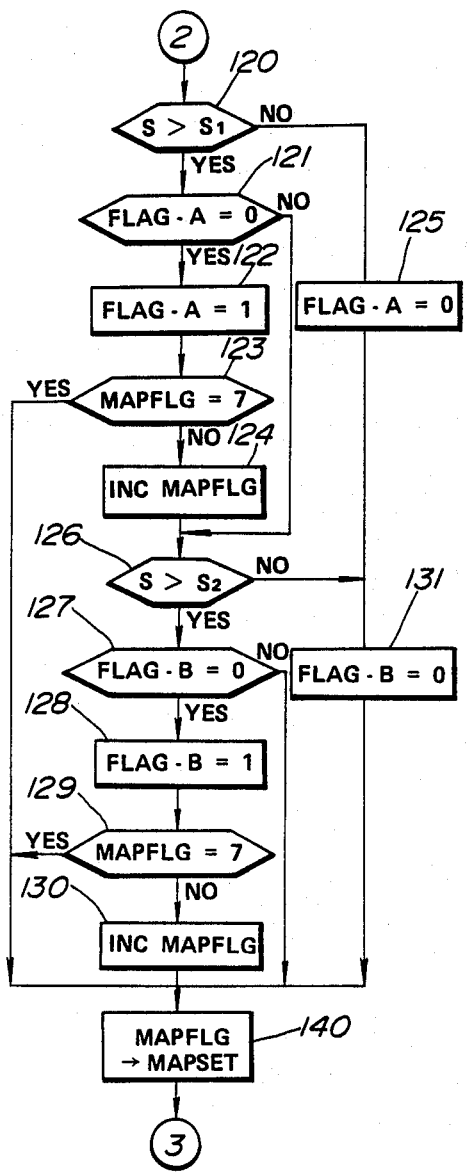
Figure 11D:
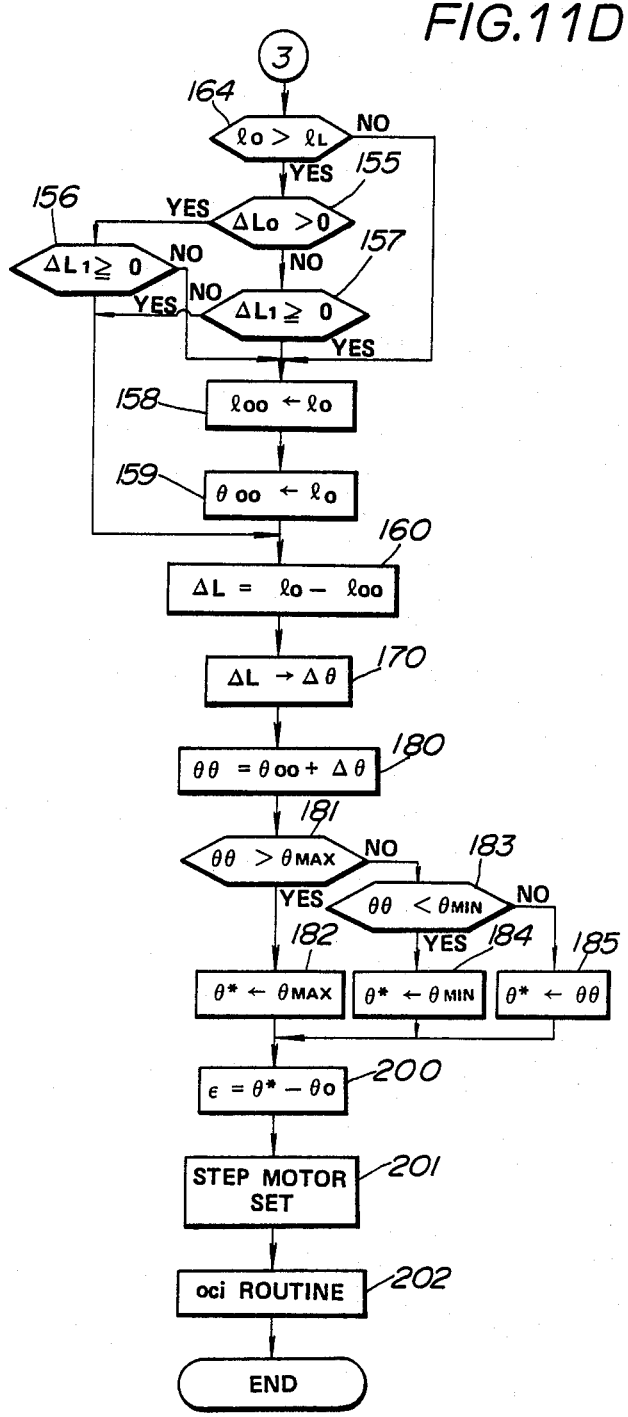

FIG. 10 shows schematically the basic control arrangement which characterizes a second embodiment of the present invention. As will be appreciated, this embodiment is basically similar to the first one and differs essentially in that upper and lower absolute accelerator depression limits are established—for example at ¼ and ¾ of the maximum amount of absolute depression (see FIG. 13 for example) so that when the accelerator depression is below the lower limit control map upgrading is inhibited while if above the upper limit upgrading is induced if the slip ratio remains below a predetermined level for a predetermined period. This control feature is shown in the flow chart of FIGS. 5A to 5C.

As will be noted steps 100 to 154 of this chart are the same as those shown in FIGS. 3A to 3C and as such will not be redundantly discussed. At step 115 the instant value of L0 (the instant value of the absolute accelerator depression) is compared with a predetermined upper limit LH. In the event that the accelerator is depressed by an amount greater than the upper limit (eg. ¾ of the maximum travel) then the program flows to step 116. On the other hand, if the value is less than LH then at step 250 L0 is compared with a lower limit LL. If the value of L0 is lower than this limit (eg. ¼ of the max. absolute depression) then it is deemed that no upgrading of the current map should be induced and the program flows to step 120. However, if the instant amount of absolute depression is between the two limits LH and LL, then at step 110 the instant amount of relative depression of the accelerator DELTA/L0 is read out of RAM. If this value is less than 0 then it is assumed that the driver is not demanding further power and is holding the accelerator in its current state of depression (or releasing the same) and that no upgrading of the control map should be entertained. If the accelerator is in fact being moved by the driver in a direction which demands further power output by the engine then at step 111 the instant slip ratio is compared with a value So, (eg. So=0.1). Subsequently the program flows through steps 112 to 114 in a manner as described previously in connection with the flow charts of FIGS. 3A to 3C (first embodiment) in a manner which induces the current map value to decreased by 1.

However, if the enquiry conducted at step 115 indicates that the instant absolute accelerator depression is greater than the upper limit LH then at step 116 the instant slip ratio S is compared with a value S0 (S0=0.1) by way of example). If the slip is greater than this value it is deemed that it is unwise to upgrade the instant map and the program flows to step 119 wherein a timer is cleared. It will be noted that in this embodiment the timer takes the form of a soft clock which is arranged to count up each time the control main control routine is run. In the instant embodiment the time for which the timer is selected to count is 0.8 seconds. As the program is induced to run by an interrupt (each 20 msec for example) then it is a simple matter to arrange for a predetermined number to correspond to this desired time value.

In the event that S is found to be less than S0 in step 117 then at step 117 an enquiry is conducted to determine if the predetermined time has elapsed or not. In the event the count of the timer has not yet reached the appropriate number then at step 118 the count is incrementally increased and the program flows on to step 120. On the other hand, if the instant count is such as to coincide with the predetermined number or has exceeded the same (viz., a suitably low slip ratio S has been maintained for 0.8 seconds) then the number of the map in current use is determined and is greater than #0 is decreased by 1 (steps 161, 162, 163). Following this the count of the timer is cleared (reset to zero for example). Steps 120 to 140 are the same as those in FIGS. 3A-C.

At step 164 the instant absolute accelerator depression value L0 is again compared with the lower limit LL. If below this value then steps 155, 156 and 157 are bypassed and the program proceeds directly to step 158. It will be noted that from this point the only difference between the instant embodiment and the first one is that the slip comparison and flag setting steps 251 to 260 are omitted.

With he above disclosed embodiment, in the event that the vehicle is traversing a dry road which exhibits good traction, the system is operating under map #2 for example (see FIG. 12), the accelerator is depressed to the point that L0 is equal or greater than the upper limit of ⅔, the throttle valve is opened to THETA/#2 and the slip ratio S is less than S0 (0.2)—the requirement of steps 116-118 and 161 to 163 are met and map upgrading is permitted. Accordingly, map #1 is selected and the throttle opening changes to THETA/LOW#1 (viz., the lower limit of the newly selected map #0). Following this, if the above mentioned requirements continue to be satisfied (no slip) the throttle opens to THETA/LOW#0. Thus, as long as wheel slip does not occur it is possible for the engine to develop an adequate amount of power and permit the driver to enjoy a satisfying amount of vehicle acceleration.

Figure 13:
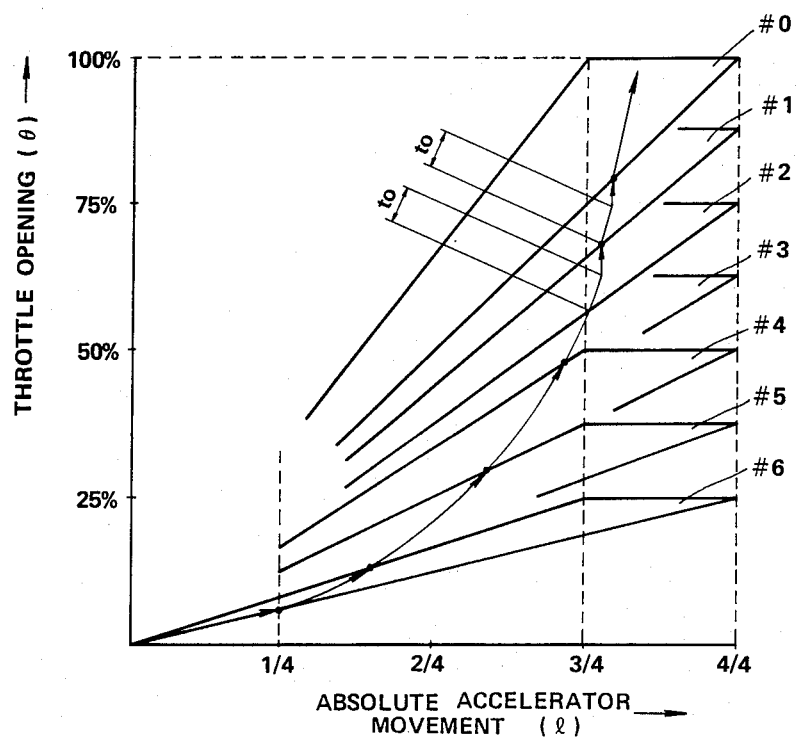
FIG. 13 is a similar graph but which demonstrates the effect of the timer which is included in the second embodiment and the control characteristics which obviate the problems encountered with the prior art at low throttle settings on slippery surfaces.

FIG. 13 shows an example of the control characteristics which can be derived using the second embodiment when the vehicle is traversing a snowy road or the like. As will be appreciated below an absolute depression of ¼ the throttle opening is held at the minimum value of the instant map #6 (it will be noted that although only 6 maps are illustrated in this figure that 8 or more may be used in a manner similar to the first embodiment) by the function provided at steps 115 and 250. This permits the engine to develop power without incurring wheel slip. Before reaching the lower depression limit (¼) step 164 permits the values L00 and THETA/00 to be renewed (steps 158 and 159). The gentle response characteristics of the lowest grade map enable optimal operation on poor surfaces.

However, now assuming that the condition of the road improves and exhibits improved traction and little wheel slip occurs, upon passing the lower limit (eg. ¼) the throttle opening degree is no longer limited to the upper limit of map #6. Viz., the upgrade inhibit provided by the lower limit LL no longer is in effect and upgrading (assuming that the slip ratio does not drop below S0) is permitted. Accordingly, as shown the throttle opening increases smoothly up until the upper accelerator depression of ⅔ is reached. A this time the timer which is built into the control routine is triggered (viz., starts to count up with each run that passes through step 118). Map upgrade is inhibited until the program passes through step 117 to step 161. Following this the throttle opening increases directly to the lower limit of the next map. Subsequently the timer is again triggered and counts up as shown. Upon termination of the second count an upgrade takes place and the throttle opening increases directly to the minimum value of the newly selected map. As this upgrade has selected the highest grade map (#0). As will be appreciated the rate at which the throttle opens with this embodiment after the accelerator is depressed to the upper limit (⅔) increases and thus promotes a sporty engine response/accelerator depression feel to the driver.

Figure 12:
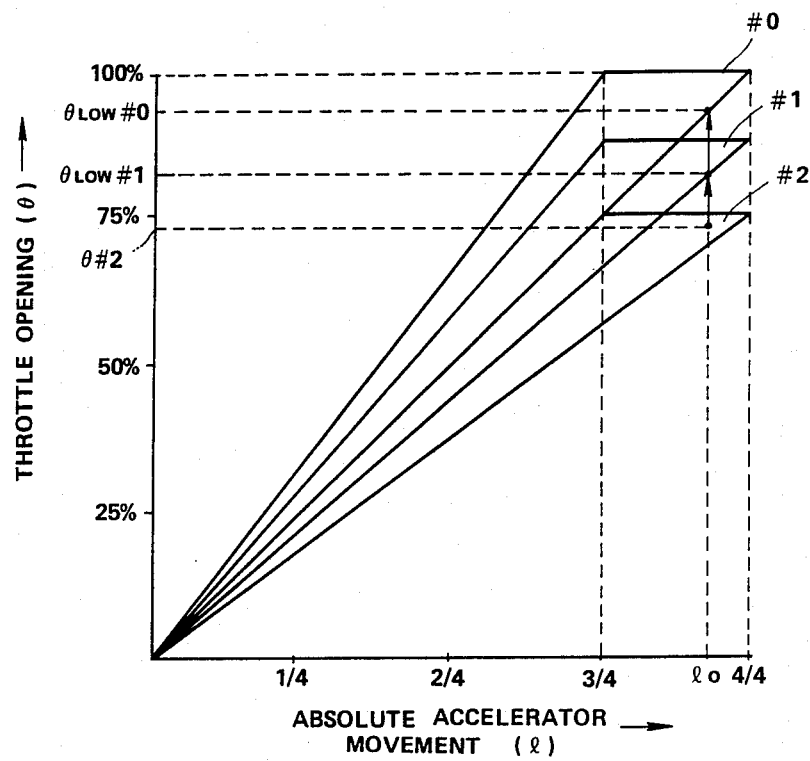
FIG. 12 is a graph showing the rapid shifting between maps which enables exhilarating sporty acceleration to be provided with the second embodiment.

It should be noted that in the case the vehicle is equipped with an automatic transmission and the driver requires powerful acceleration and deeply depresses the accelerator to induce the transmission to kickdown, it is possible to combine the effects of the kickdown with the rapid throttle opening characteristics provided with the instant embodiment in a synergistic matter. For example, it is possible to electrically trigger the downshift (using a well known technique) upon the accelerator reaching a depression which is close to or at the upper limit so that in combination with the increase in engine speed which naturally tends to result with the rapid throttle opening, an adequate amount of power is fed to the driving wheels of the vehicle. Should this induce wheel slip however, the system responds to this phenomenon and the control routine quickly flows to step 124 and/or step 130 wherein downgrading of the instant map by one or two values is induced. Subsequently, if the wheel slip disappears then rapid upgrading such as seen in FIG. 12 is possible and ensures the return of exhilarating and safe vehicle performance.

It will be further noted that if the vehicle is proceeding slowly along a slippery road with the accelerator depressed slightly (eg. less than ¼) then upgrading is inhibited even if the slip ratio suddenly drops to a level whereat an upgrade would tend to be induced by deeper accelerator depressions and the problem wherein hunting between patterns causes frequent surges of power is avoided.

It is within the scope of the present invention to utilize the data derived during the running of the main control routine of the second embodiment to effect a temporary fuel cut to the engine under control. For example, if the program flows through steps 252 or 255 to steps 253 and 254 it is possible to recognize the need to reduce the amount of engine output rather sharply. By arranging a fuel injection control routine to recognize the setting of flag FLAG.C to 1 an indication that a fuel cut should be effected.

It should be noted that in place of the three wheel speed sensors it is also possible to use a vehicle speed sensor and a sensor which senses the speed of the driven wheels of the vehicle. For example if desired it is possible to use a doppler radar or the like to measure the "ground speed" in combination with other types of sensors which are capable of detecting wheel speed or a similar parameter which is indicative of the same. As the various techniques of determining wheel slip will be obvious to those skilled in the art of automotive engineering no further discussion is deemed necessary.

It will be noted that the present invention is not limited to the above two embodiments and that the concept of the same can be widely adapted. For example, the invention is not limited to the use of 8 domain control maps etc., and more or less can be employed if so desired. If desired the domain maps can be recorded in terms of parameters other than throttle opening and accelerator depression. The present invention is not limited to the control of the engine throttle valve (or valves) and can be used in combination with other engine control programs such as those used to control the engine ignition timing, fuel injection, transmission shifting and the like. If desired the time for which the timer of the second embodiment holds upshifting can be rendered variable with respect to a given operational parameter or parameters.

What is claimed is:

1. A method of controlling an internal combustion engine for a wheeled automotive vehicle the steps comprising:
sensing a parameter which varies with a demand for engine power;
storing a set of control maps in a memory;
arranging each of said maps to produce an engine control signal, a magnitude of which increases in response to a magnitude and rate of change of said parameter;
designing said maps to exhibit control characteristics wherein the magnitude of the engine control signal for a given magnitude of said parameter, increases from map to map;
sensing an amount of wheel slip;
downgrading the maps by changing a currently used map to a map which reduces response characteristics when the wheel slip exceeds a first predetermined value;
upgrading the maps by changing the currently used map to a map which increases the response characteristics in response to:
the amount of wheel slip being below said first predetermined value; and
the control signal being produced by an instant control map assuming a maximum permissible level for an instant magnitude of said parameter.

2. A method as claimed in claim 1, wherein said step of upgrading further requires that the rate of change of the magnitude of said parameter in a direction which requires increased engine output, is greater than zero.

3. A method as claimed in claim 1 further comprising the steps of:
establishing upper and lower limits for the magnitude of said parameter;
ranging the magnitude of said parameter so that:
when the magnitude thereof is below said lower limit, upgrading of the current map in a direction which increases the response characteristics thereof is inhibited; and
when the magnitude is above said upper limit, upgrading is induced which changes the maps in a direction which increases the response characteristics in the event the wheel slip remains below said first predetermined value for a predetermined period of time.

4. A method as claimed in claim 1 further comprising the steps of:
changing the maps in a downgrading direction which reduces the response characteristics in the event that the wheel slip is below a second predetermined value.

5. A method as claimed in claim 4 further comprising step of arranging the map change which downgrades same in response to the wheel slip exceeding the second predetermined value, to occur after the change which downgrades in response to the wheel slip exceeding said first predetermined value.

6. A method as claimed in claim 1, wherein said wheel slip is determined by:
determining a value of a vehicle operation parameter which varies with vehicle speed;
determining wheel speed of driven wheels or the vehicle; and
comparing the wheel speed and vehicle speed indicative values to determine the value of difference therebetween.

7. A method as claimed in claim 6 further comprising the steps of:
determining a predetermined vehicle speed limit;
using the difference obtained in said comparing step when the vehicle speed is below said predetermined vehicle speed limit and;
using the value derived by dividing the difference obtained in said comparing step with the wheel speed of said driven wheels.

8. A method as claimed in claim 1 further comprising the steps of:
using the rate at which the power demand indicative parameter is changing to determine the change in engine control signal; and
limiting the value of the control signal to a value defined between the upper and lower limits of the instant control map.

9. A method as claimed in claim 8, wherein said power demand signal change rate is determined by cyclically noting the value of the demand signal and using the difference between the instant value and the previously recorded value and the difference between the previously recorded value and the value recorded before that.

10. A control system for an internal combustion engine for a wheeled automotive vehicle comprising:
means for sensing a parameter which varies with a demand for engine power;
memory means for storing a set of control maps, said maps being arranged to produce an engine control signal a magnitude of which increases in response to a magnitude and rate of change of said parameter, said maps being designed to exhibit control characteristics wherein the magnitude of the engine control signal for a given magnitude of said parameter, increases from map to map;
means for sensing wheel slip; and
control means for:
downgrading the maps by changing a currently used map to a map which reduces the response characteristics when the wheel slip exceeds a first predetermined value;
upgrading the maps by changing the currently used map to a map which increases the response characteristics in response to:
an amount of wheel slip being below said first predetermined value; and
the control signal being produced by the instant control map assuming a maximum permissible level for the instant magnitude of said parameter.

11. A control system as claimed in claim 10 wherein said control means further requires that the rate of change of the magnitude of said parameter in a direction which requires increased engine output is greater than zero before upgrading is permitted.

12. A method of controlling an internal combustion engine for a wheeled automotive vehicle, said engine being controlled by throttle valve means which is exclusively operated by an electronically generated engine control signal, the steps comprising:
sensing a parameter which varies with a demand for engine power;
storing a set of control maps in a memory;
arranging each of said maps to produce an engine control signal, a magnitude of which increases in response to a magnitude and rate of change of said parameter, said maps being designed to exhibit control characteristics wherein the magnitude of the engine control signal for a given magnitude of said parameter, increases from map to map;

sensing wheel slip;

downgrading the maps by changing a currently used map to a map which reduces response characteristics when the wheel slip exceeds a first predetermined value;

upgrading the maps by changing the currently used map to a map which increases the response characteristics when:

an amount of wheel slip is below said first predetermined value, and the control signal being produced by an instant control map is at a maximum permissible level from an instant magnitude of said parameter; and using said engine control signal to control said throttle valve means.

13. A control system for an internal combustion engine for a wheeled automotive vehicle comprising:

throttle valve means for controlling an amount of power produced by said engine, said throttle valve means being exclusively controlled by an engine control signal;

means for sensing a parameter which varies with a demand for engine power;

control map means for producing said engine control signal in a manner wherein a magnitude of said engine control signal increases in response to a magnitude and rate of change of said parameter, said control map means including a memory in which a plurality of control maps are stored, said maps being designed to exhibit control characteristics wherein the magnitude of the engine control signal for a given magnitude of said parameter, increases from map to map;

means for sensing wheel slip; and control means for:

downgrading the maps by changing a currently used map to a map which reduces response characteristics when the wheel slip exceeds a first predetermined value;

upgrading the maps by changing the currently used map to a map which increases the response characteristics when:

an amount of wheel slip is below said first predetermined value, and the control signal being produced by an instant control map is at a maximum permissible level for an instant magnitude of said parameter; and generating said engine control signal based on the engine control value derived using said first set of maps.

14. A wheeled vehicle comprising:

a driven wheel;

a first wheel speed sensor for detecting rotational speed of said driven wheel;

an undriven wheel;

a second wheel speed sensor for detecting rotational speed of said undriven wheel;

a manually operable accelerator;

a third sensor for detecting a position of said accelerator;

an engine;

an induction conduit through which air passes to said engine;

a single throttle valve disposed in said induction conduit for controlling an amount of air which is permitted to pass therethrough;

a servo motor unit operatively connected to said throttle valve, said servo motor being arranged to exclusively control a position of said throttle valve;

a control circuit, said control circuit being responsive to outputs of said first, second and third sensors, said control circuit being operatively connected to said servo motor unit and arranged to produce a throttle valve signal for controlling said servo motor unit, said throttle valve control signal being indicative of a degree to which said throttle valve should be opened, said control circuit comprising:

memory means for storing a plurality of engine control maps, said maps being recorded in terms of throttle valve opening and absolute accelerator movement, said maps being arranged to determine an angle to which the throttle valve should be opened for a given accelerator movement;

wheel slip detection means for determining an amount of wheel slip which is occurring based on the outputs of said first and second sensors; and selection means for selecting which of said plurality of maps should be used, said selection means being responsive to the amount of wheel slip which is detected.

* * * * *